Figure 1:
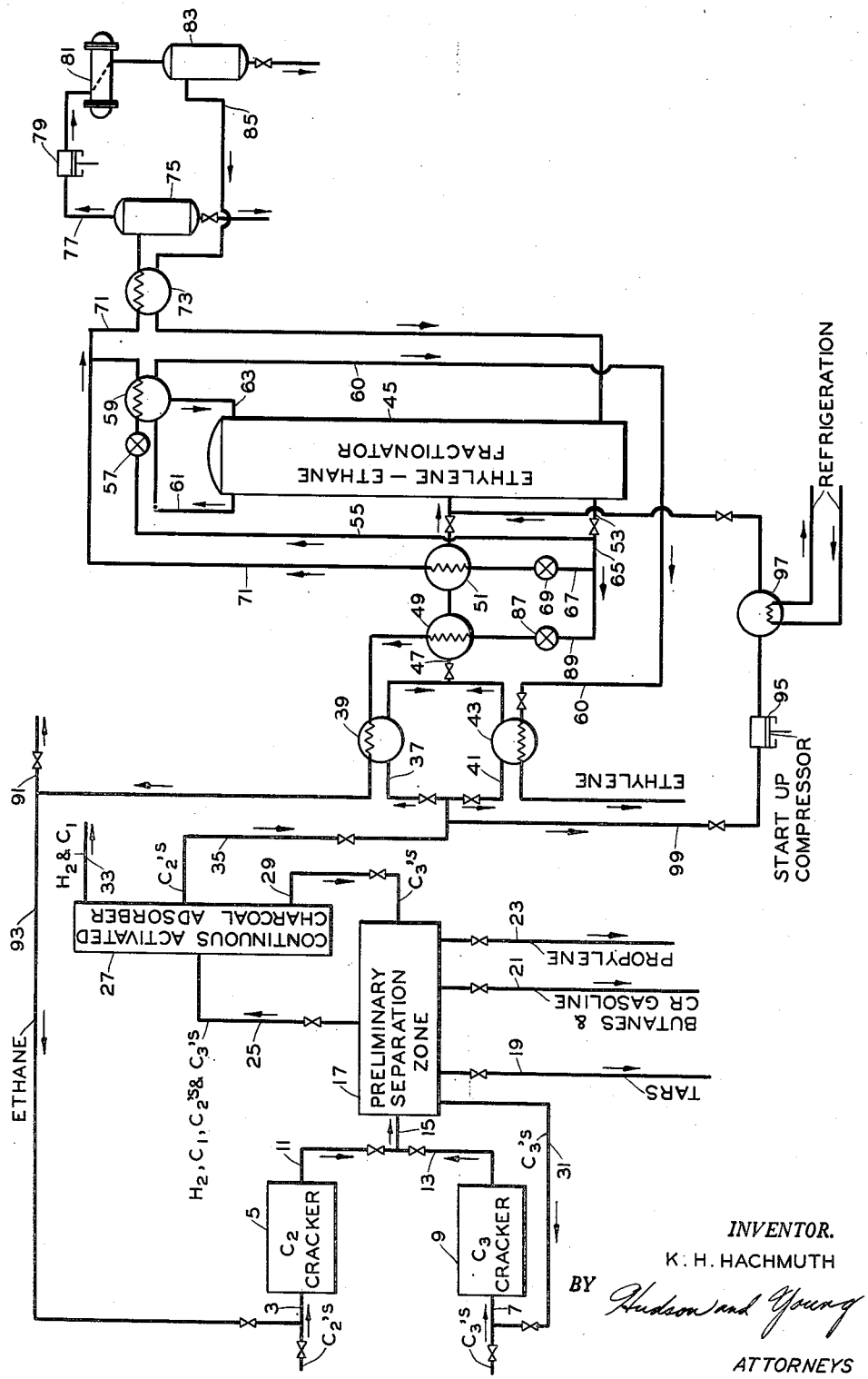

June 10, 1952 K. H. HACHMUTH 2,600,110
FRACTIONAL DISTILLATION METHOD
Filed Jan. 4, 1949 2 SHEETS—SHEET 2

INVENTOR.
K.H. HACHMUTH
BY Hudson and Young
ATTORNEYS

Patented June 10, 1952

2,600,110

UNITED STATES PATENT OFFICE 2,600,110

FRACTIONAL DISTILLATION METHOD

Karl H. Hachmuth, Bartlesville, Okla., assignor to Phillips Petroleum Company, a corporation of Delaware Application January 4, 1949, Serial No. 69,147

5 Claims. (Cl. 62—175.5)

This invention relates to the separation of vaporizable materials. In one of its more specific aspects it relates to the separation of vaporizable materials by fractional distillation. In still another of its more specific aspects it relates to the separation of multi-component mixtures of low-boiling normally gaseous materials by a low-temperature fractional distillation process using one of the products of the separation as the refrigerant.

In the separation of vaporizable materials by fractional distillation in a fractionator it is necessary to remove heat from the overhead vapors and to add heat to the kettle in order to provide liquid reflux in the enriching section and vapors in the stripping section of the fractionator. The most common method of removing heat from the overhead vapor so as to at least partially condense the vapor and provide liquid reflux is to transfer heat from the vapor to a cooling medium by indirect heat-exchange. Water is the most common heat-exchange material used to take up heat so as to condense or partially condense the overhead vapors. Stripping vapors in the stripping section of the fractionator are most commonly provided by equipping the fractionator with a reboiler or reboiling coil and using steam or other outside sources of heat to reboil the fractionator.

Up until recently heat energy from steam was a great deal cheaper than energy supplied electrically. But at present the increased cost of fuel, such as coal or fuel gas, has made the cost of heat energy from steam more nearly approximate the cost of electrical energy, since fuel costs have a greater effect on the cost of steam than in the case of electrical energy. I have invented a process for separating a multi-component mixture of vaporizable material which takes advantage of this economic factor, that is, I have invented a fractional distillation process which utilizes the heat removed from the overhead vapors to reboil or add heat to the kettle of the fractionator. I remove the heat from the overhead vapors and transfer it to the kettle of the fractionator by mechanical means, that is, a heat-pump system operated mechanically and supplied energy electrically. In difficult separations where the boiling points of the components to be separated are relatively close together, I find that the process of my invention usually has the advantage economically over the ordinary process where heat energy is supplied by steam, when the cost of energy supplied electrically is no more than about four times the cost of the equivalent amount of heat energy supplied by steam.

Another important feature of the improved fractionation process of my invention is that less equipment is required than in carrying out fractionation by the usual methods. The process of my invention eliminates the reboiler or overhead condenser according to the manner of operation selected, since I use one of the products of the separation as a heat transfer medium to carry heat from the overhead vapors to the kettle portion of my fractionation zone. In so operating a portion of one of the products of the separation is removed directly from and reintroduced directly into the fractionator. When a portion of the kettle product is being used as the heat transfer medium it is reintroduced into the kettle portion of the fractionator and when a portion of the overhead vapors is used as the heat transfer medium it is reintroduced into the overhead vapors. Thus, in either case the overhead condenser or the reboiler coil is eliminated.

The process of my invention is particularly adaptable to separations such as the separation and recovery of ethylene from a mixture of ethylene and ethane by fractional distillation. In separation such as this fractionation temperatures must necessarily be below ordinary atmospheric temperatures since the critical temperature of one of the components is below ordinary atmospheric temperatures. Whether the predominantly ethane kettle product or the predominantly ethylene overhead vapor is used as the heat transfer medium, I prefer to speak of it as the refrigerant, and in the process of my invention as the internal-refrigerant. Where relatively pure products are being produced in a refrigerated separation process and where these products are of such nature that they can be used as refrigerants, I find that refrigeration work can be reduced by using one (or more) of the products as an internal-refrigerant. When I use the term "internal-refrigerant" I mean a refrigerant which is introduced directly into a process stream at some suitable point and thus becomes part of the process stream. An external-refrigerant moves around the refrigeration cycle and does not directly enter a process stream.

An object of this invention is to provide an improved fractionation method for separating a multi-component mixture of vaporizable materials.

Another object of this invention is to provide an improved fractional distillation method for separating a multi-component mixture of low-boiling normally gaseous materials into a low-boiling fraction and a high-boiling fraction.

Still another object of this invention is to provide a method of transferring heat from the overhead vapors to the bottom portion of a fractionator to reboil the fractionator.

Still another object of this invention is to provide an internal-refrigerant low-temperature fractional distillation method for separating and recovering ethylene from a mixture of ethylene and ethane.

Other objects and advantages of my invention will become apparent, to one skilled in the art, from this disclosure.

The fractional distillation process of my invention may be applied to the separation of vaporizable materials but is preferably applied to difficult separations wherein the temperature differential between the top and the bottom of the fractionator is not very great. The process is preferably applied to the separation of a multi-component mixture of low-boiling normally gaseous materials into a low-boiling fraction and a high-boiling fraction such as the separation of ethylene and ethane, using either as the internal-refrigerant; butadiene and butene-2, using butene-2 as the internal-refrigerant; propane and propylene, using either as the internal-refrigerant; or the separation of nitrogen from methane, using either as the internal-refrigerant. The process of my invention is not limited to low-temperature fractionation wherein refrigeration is necessary. It may be applied to the separation of vaporizable materials such as $C_5$ to $C_8$ hydrocarbons or even higher boiling materials, especially difficult separations where the temperature differential over the fractionator is relatively small. Of course, refrigeration for the separation of these materials is not necessary, and when using the process of my invention for the separation of these materials I prefer to refer to my process as a heat-pump system, that is, heat is pumped from the overhead vapors to the kettle of the fractionator. In carrying out my process, it is not desirable to use a product material as internal-refrigerant which polymerizes upon the application of pressure or which corrodes equipment or which is highly explosive in nature since the material or product used as the internal-refrigerant or heat transfer medium is compressed in suitable equipment. I prefer to use the process of my invention in separating binary mixtures in which case either the overhead or the bottoms may be used as the heat transfer medium, preferably the purest stream. I find that using the purest stream gives the highest thermodynamic efficiency. In using the process of my invention to separate a mixture containing more than two components, I find that it is preferable to use the product stream which is predominantly one component as the internal-refrigerant.

Figure 2:
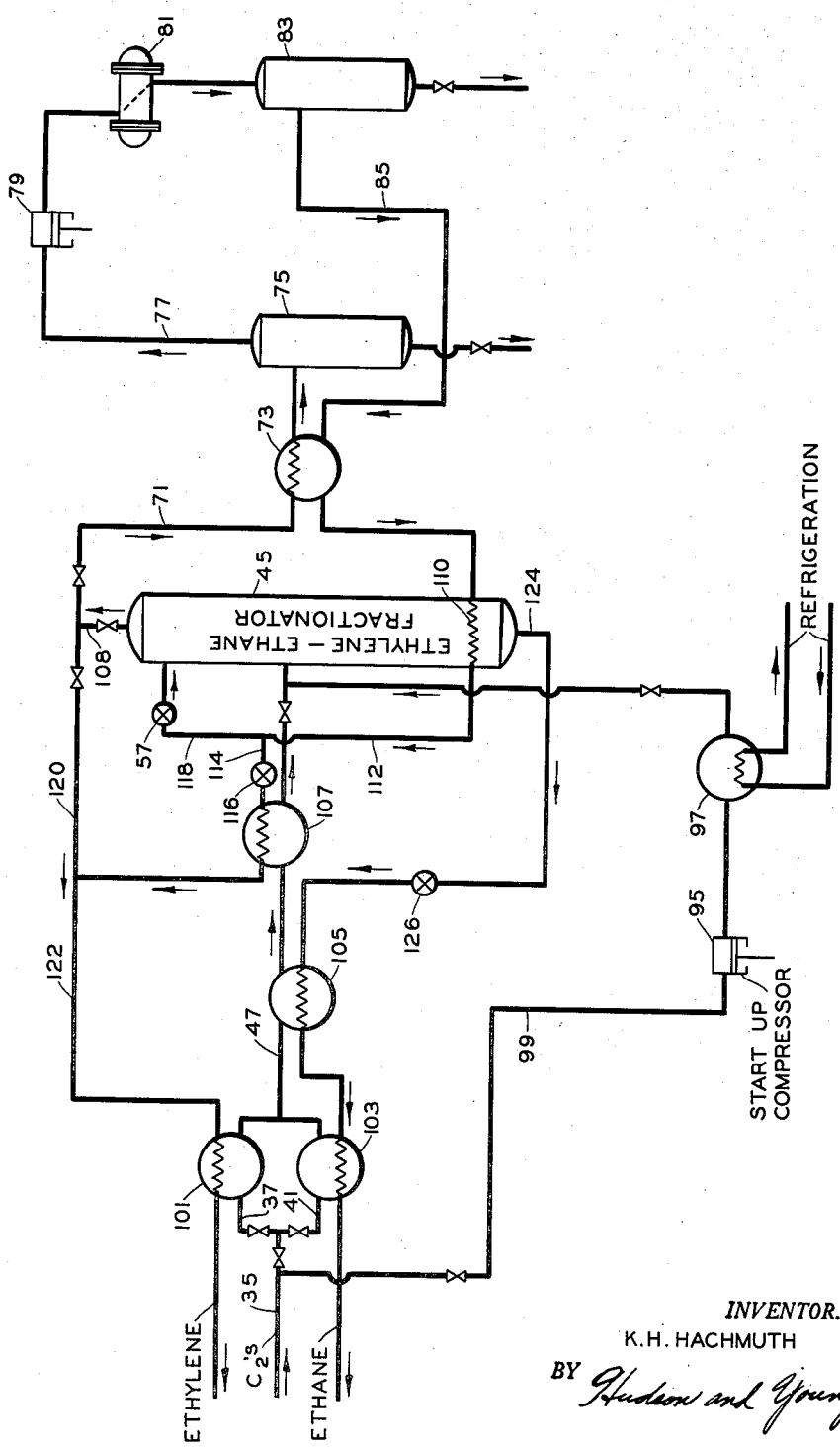

Two drawings accompany and are a part of this disclosure. Figure 1 is a diagrammatic flow sheet showing an integrated process wherein $C_2$ and $C_3$ hydrocarbons are thermally cracked separately. The ethane and the ethylene in the effluent from the two cracking operations are separated from the other products in the effluent and are ultimately isolated using a continuous activated charcoal adsorber. The ethane and ethylene stream is then fed to a low-temperature fractionator and the ethylene is separated and recovered using the process of my invention. In the ethylene-ethane separation step ethane is used as the internal-refrigerant. Figure 2 is a diagrammatic flow sheet showing one manner in which an ethane and ethylene feed stream is separated by the process of my invention when ethylene is used as the internal-refrigerant.

With reference to Figure 1, I will now discuss the application of the process of my invention to the separation and recovery of ethylene from a stream containing ethylene and ethane, a preferred specific embodiment of my invention. The quantities, temperatures, pressures, purities, reflux ratios, etc. referred to in the following discussion are not to unduly limit the scope of my invention. The preparation of the ethylene-ethane stream separated by the novel fractional distillation process of my invention is set forth in detail and discussed at greater length in the application of Walter A. Goldtrap, Serial No. 82,932, filed March 23, 1949. A $C_2$ stream comprised predominantly of ethane is fed through line 3 into $C_2$ cracker 5 and a $C_3$ stream comprised predominantly of propane is fed through line 7 into $C_3$ cracker 9. The $C_2$ and $C_3$ crackers are preferably pebble-heater apparatus, thermally cracking the $C_2$'s and $C_3$'s. The effluent from $C_2$ cracker 5 is withdrawn through line 11 and is combined with the effluent of $C_3$ cracker 9 which is withdrawn through line 13. The combined effluent are passed through line 15 into a preliminary separation zone 17. Tars, butanes and CR gasolines and propylene are separated from the effluent and are withdrawn from the preliminary separation zone through lines 19, 21 and 23 respectively. A stream comprised predominantly of $H_2$, $C_1$, $C_2$'s and $C_3$'s is separated from the cracker effluents, withdrawn from the preliminary separation zone 17 through line 25 and passed to a continuous activated charcoal adsorber 27. A bottoms stream comprised predominantly of $C_3$'s is withdrawn from adsorber 27 and passed back to preliminary separation zone 17 through line 29. The propane is ultimately separated from this stream in separation zone 17 and recycled through line 31 to line 7 and thence into $C_3$ cracker 9. The $H_2$, $C_1$ and lighter in the feed to continuous activated charcoal adsorber 27 is taken overhead from the adsorber through line 33. This stream is usually used or sold as fuel. A side stream containing ethylene and ethane is withdrawn from adsorber 27 and passed through line 35 to a cooling zone to prepare the $C_2$ stream for final separation. The $C_2$ stream passed through line 35 is split into two portions, one portion being passed through line 37 and indirect heat-exchanger 39. The other portion is passed through line 41 and indirect heat-exchanger 43. The portion of the feed passed through heat-exchanger 39 is cooled by indirect heat-exchange with a portion of the kettle product from ethylene-ethane fractionator 45 as will hereinafter be set forth. The portion of the $C_2$ feed stream passed through heat-exchanger 43 is cooled by indirect heat-exchange with the overhead ethylene product stream from fractionator 45 as will hereinafter be set forth. The two portions of the $C_2$ feed stream are combined and passed by line 47 through heat-exchangers 49 and 51 wherein the feed stream is further cooled by indirect heat-exchange with the kettle product from fractionator 45. I prefer this manner of cooling the $C_2$ feed stream prior to its introduction into fractionator 45; however, I do not want to be unduly limited by the heat-exchange scheme set forth since other heat-exchange methods to precool the feed with the overhead and bottoms of the fractionator would work. A portion of the liquid kettle product is withdrawn through lines 53 and 55 and passed through an expansion zone 57 wherein it is expanded and cooled. The expanded and cooled stream is then passed through heat-exchanger 59 which is the overhead condenser for fractionator 45. Overhead vapors from fractionator 45 are passed into overhead condenser 59 through line 61 where they are partially condensed by indirect heat-exchange with the cooled effluent vapors and liquid from expansion zone 57. Condensed overhead vapors are withdrawn from overhead condenser 59 and passed back to fractionator 45 through line 63 and are used as liquid reflux. A portion of the liquid kettle product from fractionator 45 is withdrawn through lines 53, 65 and 67 and passed through expansion zone 69 wherein the liquid stream is expanded and cooled. The expanded vapor and liquid from expansion zone 69 is passed to indirect heat-exchanger 51 where they cool the feed to fractionator 45. The expanded streams leaving exchanger 51 and overhead condenser 59 are combined and passed through line 71 into heat-exchanger 73 wherein they are heated by indirect heat-exchange as hereinafter set forth. The vapors which may contain a small amount of impurities or liquid are then passed to separator or receiver 75 before compressor 79. Vapors are withdrawn from separator or receiver 75 through line 77 and are compressed in compressor 79 and the compressed vapors are cooled in cooler 81. The compressed vapors are preferably cooled in cooler 81 by indirect heat-exchange with cooling water, but of course, any cooling medium may be used. The cooled, compressed vapors are then passed to separator or receiver 93 wherein impurities, liquid and/or polymers are separated. The compressed and cooled vapor in receiver 83 is withdrawn through line 85 and further cooled, preferably to a point where condensation is imminent, that is, to a point at or near its dew point, in heat-exchanger 73. The compressed and cooled vapor which is at or near its dew point, having a higher heat content than the corresponding amount of liquid kettle product used in the refrigeration cycle, is then passed directly into the kettle portion of fractionator 45 wherein the compressed and cooled vapors preferably directly contact the kettle product. The vapor condenses in the kettle and stripping section giving up the heat necessary to reboil fractionator 45. The vapor passes into the kettle product furnishing stripping section vapor in fractionator 45, some heat exchange taking place with the stripping section liquid which passes to the kettle portion of fractionator 45. A portion of liquid kettle product from fractionator 45 is passed into expansion zone 87 through lines 53, 65 and 89 wherein it is expanded and cooled. The effluent from expansion zone 87 is then passed through heat-exchangers 49 and 39 to cool the feed to fractionator 45 as hereinbefore set forth. The heated stream leaving indirect exchanger 39 is then the ethane make product produced by fractionator 45. It may be withdrawn from the system through line 91 or passed through lines 93 and 3 back into $C_2$ cracker 5 for further conversion. Predominantly ethylene overhead vapors are withdrawn from overhead condenser 59 and are passed by line 60 through indirect heat-exchanger 43 wherein they cool the portion of the feed stream passed through exchanger 43 by line 41. The heated ethylene vapor stream leaving exchanger 43 is then the overhead make product produced by fractionator 45. A start-up system is shown on diagrammatic flow sheet Figure 1 which comprises start-up compressor 95 and cooler 97. The $C_2$ feed stream in line 35 is passed by line 99 to compressor 95 wherein it is compressed, to cooler 97 wherein the compressed feed stream is cooled and at least partially liquefied, and thence into fractionator 45. A refrigeration system (not shown) is provided to cool and at least partially liquefy the start-up feed stream in cooler or cooling zone 97.

In the system shown in diagrammatic flow sheet Figure 1 the ethane kettle product is used as the internal-refrigerant. Diagrammatic flow sheet Figure 2 shows another method of operation wherein the ethylene overhead product is used as the internal-refrigerant. Many of the reference characters on the two figures are the same since they represent the same equipment performing essentially the same operations. Referring now to Figure 2, the $C_2$ feed stream from a continuous activated charcoal adsorber or other source is fed through line 35 to the feed stream heat removal zone. The feed stream is split into two portions. One portion is passed through heat-exchanger 101 by line 37. The other portion is passed through heat-exchanger 103 by line 41. The portion of the feed stream passed through indirect heat-exchanger 101 gives up heat to the ethylene overhead product from fractionator 45. The portion of the feed stream passed through indirect heat-exchanger 103 is cooled by the ethane kettle product from fractionator 45. The effluent feed streams from exchangers 101 and 103 are recombined and passed by line 47 through heat-exchangers 105 and 107. The feed stream passed through indirect heat-exchange 105 is cooled by the ethane kettle product from fractionator 45. The feed stream upon passing through indirect heat-exchanger 107 is cooled by a portion of the ethylene overhead product from fractionator 45 as will hereinafter be set forth. The cooled $C_2$ feed stream leaving heat-exchanger 107 is passed into fractionator 45. The overhead vapors from ethylene fractionator 45 are withdrawn through line 108. A portion of the overhead vapors are passed through line 71 into indirect heat-exchanger 73 and then into separator or receiver 75. Vapors are withdrawn from receiver 75 through line 77 and are compressed and cooled in compressor 79 and cooler 81 which is preferably cooled by cooling water. The compressed and cooled vapor is passed into separator or receiver 83 where liquid impurities may be separated from the vapor. Vapor is withdrawn from receiver 83 and passed by line 85 to indirect heat-exchanger 73 where it is cooled to a point where condensation is imminent. The compressed and cooled vapor now at or near its dew point is passed into reboiler coil 110, the vapor temperature being a few degrees higher than the kettle temperature, preferably 5–10° F. higher. The vapor condenses in reboiler coil 110 giving up heat which reboils fractionator 45. The condensed liquid is withdrawn from reboiler coil 110 by line 112. A portion of the condensed liquid stream is passed by line 114 to expansion zone 116 wherein the liquid is expanded and cooled. The cooled vapor and liquid from expansion zone 116 is passed through indirect heat-exchanger 107 wherein they cool the feed to fractionator 45. Another portion of the liquid stream condensed in reboiler coil 110 is passed by line 118 to expansion zone 57 wherein the liquid is expanded and cooled. The vapor and liquid from expansion zone 57 is passed directly into the top of fractionator 45 where the liquid portion furnishes reflux for fractionator 45. A portion of the overhead, predominantly ethylene, vapors are withdrawn by line 120. The overhead ethylene vapors withdrawn by line 120 and the ethylene vapors withdrawn from indirect heat-exchanger 107 are combined and passed by line 122 through indirect heat-exchanger 101 wherein they cool the portion of the C₂ feed stream passed by line 37 through indirect heat-exchanger 101. The ethylene stream leaving exchanger 101 is then the overhead make product from fractionator 45. The liquid predominantly ethane kettle product is withdrawn from fractionator 45 and passed by line 124 to expansion zone 126 wherein it is expanded and cooled. The ethane effluent from expansion zone 126 is passed through indirect heat-exchangers 105 and 103 wherein the C₂ feed stream to fractionator 45 is cooled. The vaporous ethane leaving exchanger 103 is then the kettle make product from fractionator 45. The ethane kettle make product stream may be used as desired such as feed or recycle to a C₂ cracker like that shown in Figure 1. Figure 2 shows a start-up system the same as that system shown in Figure 1. The C₂ feed stream is passed by line 99 through start-up compressor 95 and cooler 97 wherein the C₂ feed stream is compressed and at least partially liquefied prior to its introduction into fractionator 45. Cooler 97 is cooled by a refrigeration system (not shown).

In carrying out the process of my invention using either ethane kettle product or the ethylene overhead product as the internal-refrigerant, I prefer that the ethane-ethylene stream fed to fractionator 45 contain at least 20 per cent ethylene. I prefer to operate fractionator 45 under a pressure of from 50 to 250 pounds per square inch absolute and under a liquid reflux to overhead product ratio of from 5:1 to 11:1. I find that it is advisable in operating the fractional distillation process of my invention to have no more than 12 mol per cent ethane in the overhead vapors when the overhead vapors are being used as the internal-refrigerant and with no more than 12 per cent ethylene in the kettle product when the kettle product is being used as the internal-refrigerant. I find that it is still better to have no more than 8 mol per cent ethane in the overhead vapors when the overhead vapors are being used as the internal-refrigerant and no more than 8 per cent ethylene in the kettle product when the kettle product is being used as the internal-refrigerant. The fractional distillation process of my invention is preferably operated with a minimum ΔT on the low temperature heat-exchangers of from 5 to 10° F.

Following is an example of my invention. The quantities, temperatures, pressures, purities, reflux ratios and etc. are not to be deemed to unduly limit the scope of my invention. Reference is made to diagrammatic flow sheet Figure 1 and the separation of the ethane-ethylene stream is made by the method as set out in flow sheet Figure 1. An ethane-ethylene stream having the following composition and at a temperature of 100° F. and under a pressure of 142 pounds per square inch gauge is passed to the feed cooling zone via line 35 at a rate of 3681 mols/S. D.

*Feed*

|  | Mols/S. D. |
| --- | --- |
| Methane | 5 |
| Ethylene | 3027 |
| Ethane | 639 |
| Propylene | 5 |
| Propane | 5 |
| Total | 3681 |

By indirect heat-exchange with the expanded kettle product from fractionator 45 and the overhead make product from fractionator 45, the feed stream is cooled to −47° F. and is introduced into fractionator 45. Fractionator 45 operates under a pressure of 125 pounds per square inch gauge with a top temperature of −58° F. and a bottom temperature of −31° F. Fractionator 45 has a two-foot I. D. and is 85 feet high. The fractionator is packed with 69 feed of Raschig rings (217 cubic feet). 226 mols per hour of liquid kettle product is expanded and passed through overhead condenser 59 to partially condense the overhead vapors. 74 mols per hour of kettle product is expanded and passed through indirect heat-exchanger 51 to cool the feed making a total of 300 mols per hour of kettle product used in the internal-refrigeration cycle. The combined, expanded, ethane kettle product, refrigeration stream is compressed and cooled in the refrigeration system to a temperature of −31° F. and a pressure of 125 pounds per square inch gauge. The compressed and cooled vapor stream is then passed back into the kettle portion of fractionator 45 where the stream directly contacts the kettle product and furnishes stripping section vapors in fractionator 45. Overhead ethylene make product gas is withdrawn from overhead condenser 59 at a rate of 3318 mols/S. D. and passes through heat-exchanger 43 wherein it is heated to 92° F. in cooling the feed. This ethylene make stream has the following composition:

*Ethylene make product stream*

|  | Mols/S. D. |
| --- | --- |
| Methane | 5 |
| Ethylene | 3019 |
| Ethane | 294 |
| Total | 3318 |

The ethane make product stream is withdrawn from the kettle of fractionator 45 at a rate of 363 mols/S. D. and passes through heat-exchangers 49 and 39 to cool the feed to fractionator 45. The ethane make product stream leaves heat-exchanger 39 at a temperature of 92° F. and has the following composition:

*Ethane make product stream*

|  | Mols/S. D. |
| --- | --- |
| Ethylene | 8 |
| Ethane | 345 |
| Propylene | 5 |
| Propane | 5 |
| Total | 363 |

As will be evident to those skilled in the art, various modifications of this invention can be made, or followed, in the light of the foregoing disclosure and discussion, without departing from the spirit or scope of the disclosure or from the scope of the claims.

I claim:

1. An internal-refrigerant low-temperature fractional distillation process for separating a multi-component mixture of vaporizable material into a low-boiling fraction and a high-boiling raction which comprises, passing said mixture into a fractionation zone, withdrawing from heat-exchange relationship with the kettle product of said fractionation zone a liquid stream, passing at least a portion of said stream through an expansion zone and therein vaporizing at least a portion of and cooling same, subsequently passing said expanded material in direct heat-exchange relationship with overhead vapors of said fractionation zone to condense at least a portion of said overhead vapors, utilizing resulting condensed liquid as refluxing liquid in said fractionation zone, withdrawing vapors overhead as said low-boiling fraction of said first mixture, compressing and partially cooling at least a portion of said expanded material, subsequently passing said compressed material into indirect heat-exchange relationship with the kettle product of said fractionation zone to transfer heat from said material to said kettle product, and withdrawing said kettle product as said high-boiling fraction of said first mixture, said material used in heat-exchange relationship consisting of a product of said fractionation zone.

2. An internal-refrigerant low-temperature fractional distillation process for separating a multi-component mixture of low-boiling normally gaseous materials into a low-boiling fraction and a high-boiling fraction which comprises, passing said mixture into a fractionation zone, withdrawing from heat-exchange relationship with the kettle product of said fractionation zone a liquid stream, passing at least a portion of said stream through an expansion zone and therein vaporizing at least a portion of and cooling same, subsequently passing said expanded material in direct heat-exchange relationship with overhead vapors of said fractionation zone to condense at least a portion of said overhead vapors, utilizing resulting condensed liquid as refluxing liquid in said fractionation zone, withdrawing vapors overhead as said low-boiling fraction of said first mixture, compressing and partially cooling at least a portion of said expanded material, subsequently using the heat content of said compressed material to reboil said fractionation zone, and withdrawing said kettle product as said high-boiling fraction of said first mixture, said material used to condense overhead vapors and to reboil said fractionation zone consisting of a product of said fractionation zone.

3. An internal-refrigerant low-temperature fractional distillation process for separating a multi-component mixture of vaporizable material into a low-boiling fraction and a high-boiling fraction which comprises, passing said mixture into a fractionation zone, withdrawing from heat-exchange relationship with the kettle product of said fractionation zone a liquid stream, passing at least a portion of said stream through an expansion zone and therein vaporizing at least a portion of and cooling same, subsequently passing said expanded material in direct heat-exchange relationship with overhead vapors of said fractionation zone to condense at least a portion of said overhead vapors, utilizing resulting condensed liquid as refluxing liquid in said fractionation zone, withdrawing vapors overhead as said low-boiling fraction of said first mixture, compressing and partially cooling at least a portion of said expanded material, subsequently passing said compressed material into heat-exchange relationship with the kettle product of said fractionation zone to transfer heat from said material to said kettle product, and withdrawing said kettle product as said high boiling fraction of said first mixture, said material used in heat-exchange relationship consisting of a product of said fractionation zone.

4. An internal-refrigerant low-temperature fractional distillation process for separating a multi-component mixture of vaporizable material into a low-boiling fraction and a high-boiling fraction which comprises, passing said mixture into a fractionation zone, withdrawing from heat-exchange relationship with the kettle product of said fractionation zone a liquid stream, passing at least a portion of said stream through an expansion zone and therein vaporizing at least a portion of and cooling same, subsequently passing said expanded material in direct heat-exchange relationship with overhead vapors of said fractionation zone to condense at least a portion of said overhead vapors, utilizing resulting condensed liquid as refluxing liquid in said fractionation zone, withdrawing vapors overhead as said low-boiling fraction of said first mixture, compressing and partially cooling at least a portion of said expanded material, subsequently passing said compressed material into heat-exchange relationship with the kettle product of said fractionation zone to transfer heat from said material to said kettle product, withdrawing said kettle product as said high-boiling fraction of said first mixture, said material used in heat-exchange relationship consisting of a product of said fractionation zone, and passing said high and low-boiling fractions in indirect heat-exchange with said original vaporizable material.

5. An internal-refrigerant low-temperature fractional distillation process for separating a multi-component mixture of vaporizable material into a low-boiling fraction and a high-boiling fraction which comprises, passing said mixture into a fractionation zone, withdrawing from heat-exchange relationship with the kettle product of said fraction zone a liquid stream, passing at least a portion of said stream through an expansion zone and therein vaporizing at least a portion of and cooling same, subsequently passing said expanded material in direct heat-exchange relationship with overhead vapors of said fractionation zone to condense at least a portion of said overhead vapors, utilizing resulting condensed liquid as refluxing liquid in said fractionation zone, withdrawing vapors overhead as said low-boiling fraction of said first mixture, compressing and partially cooling at least a portion of said expanded material, removing impurities, liquids, and polymers from said portion of the expanded material, subsequently passing said compressed material into heat-exchange relationship with the kettle product of said fractionation zone to transfer heat from said material to said kettle product, and withdrawing said kettle product as said high-boiling fraction of said first mixture, said material used in heat-exchange relationship consisting of a product of said fractionation zone.

KARL H. HACHMUTH.

REFERENCES CITED

The following references are of record in the file of this patent:

UNITED STATES PATENTS

| Number | Name | Date |
|---|---|---|
| 1,073,843 | Blau | Sept. 23, 1913 |
| 2,151,248 | Vaughan | Mar. 21, 1939 |
| 2,230,219 | Carey | Feb. 4, 1941 |
| 2,327,643 | Houghland | Aug. 24, 1943 |
| 2,482,304 | Van Nuys | Sept. 20, 1949 |
| 2,496,380 | Crawford | Feb. 7, 1950 |